United States Patent [19]

Stieff

[11] Patent Number: 4,729,626
[45] Date of Patent: Mar. 8, 1988

[54] SELF-LOCKING FIBER OPTIC SEAL

[75] Inventor: Lorin R. Stieff, Kensington, Md.

[73] Assignee: The Fiber-Lock Corporation, Kensington, Md.

[21] Appl. No.: 398,490

[22] Filed: Jul. 15, 1982

[51] Int. Cl.$^4$ .............................................. G02B 6/36
[52] U.S. Cl. ........................... 350/96.22; 350/96.10; 350/96.24; 350/96.20; 340/541; 70/416
[58] Field of Search ............... 350/96.10, 96.15, 96.20, 350/96.22, 96.24; 340/541, 542, 543, 555, 556; 70/1, 416, DIG. 51

[56] References Cited

U.S. PATENT DOCUMENTS

| | | | |
|---|---|---|---|
| 3,455,625 | 7/1969 | Brumley et al. | 350/96.22 |
| 3,637,284 | 1/1972 | Plyer | 350/96.20 |
| 4,095,872 | 6/1978 | Stieff et al. | 350/96.20 X |
| 4,106,849 | 8/1978 | Stieff | 350/96.24 |
| 4,161,348 | 7/1979 | Ulrich | 350/96.20 |
| 4,354,731 | 10/1982 | Mouissie | 350/96.20 X |

*Primary Examiner*—William L. Sikes
*Assistant Examiner*—Akm E. Ullah
*Attorney, Agent, or Firm*—James Creighton Wray

[57] ABSTRACT

A seal has a fiber optic bundle which passes through a fastening device. One end of the bundle is exposed to a light source and the light pattern emitted from the other end is observed to determine whether anyone has tampered with the bundle or the fastening device. The bundle has end fittings which are received in intersecting passageways formed in a block and which pass through each other at the intersection. A flat portion of one end fitting passes through a one-way push nut integrally formed in the other end fitting to interlock the fittings. Alternatively, one fitting is press fit in the block and the other fitting is engaged by a one-way push nut mounted in an enlarged portion of its respective passageway. The shapes of the passageways correspond to the shapes of their respective fittings to prevent rotation of the fittings and to align the fittings for intermeshing with each other. The fibers in the bundle are divided and extend through divided passageways formed in one of the end fittings. The block is unitary or is formed of two mirror image halves. A hanger receiving hole is formed in the block.

41 Claims, 16 Drawing Figures

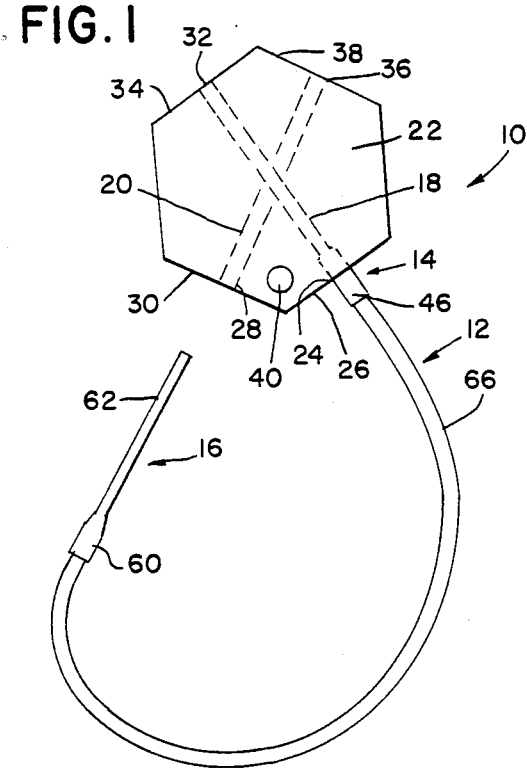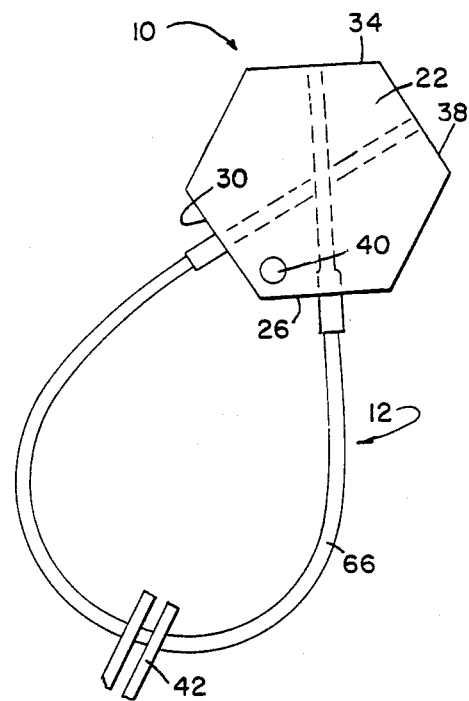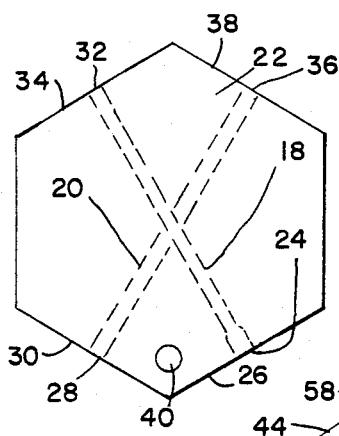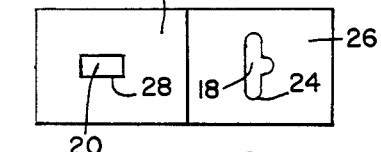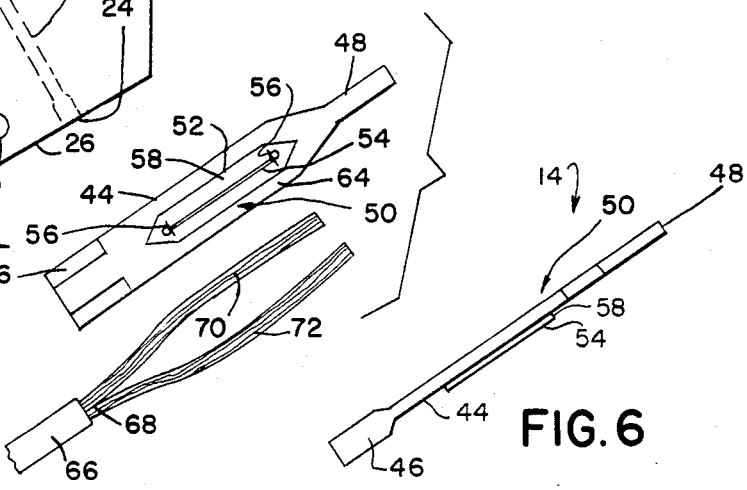

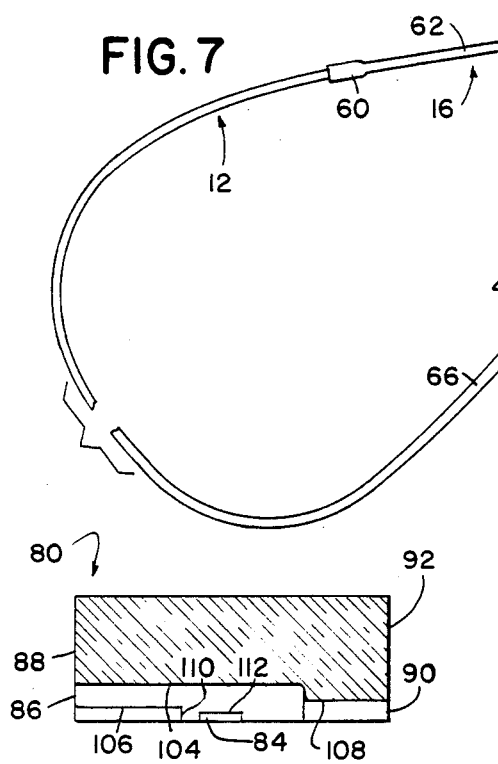
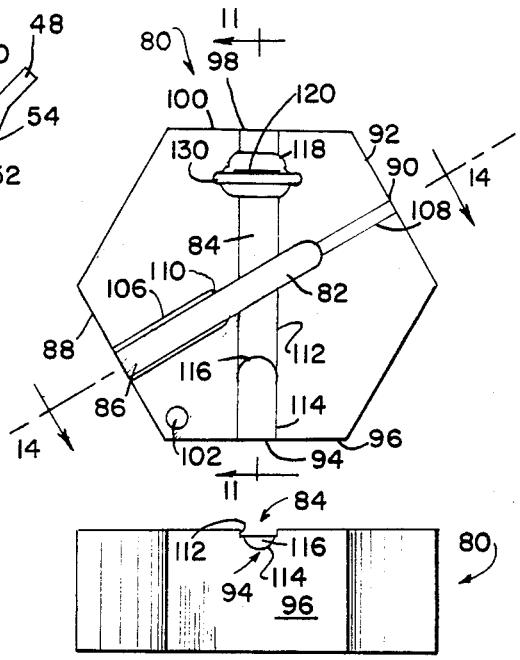
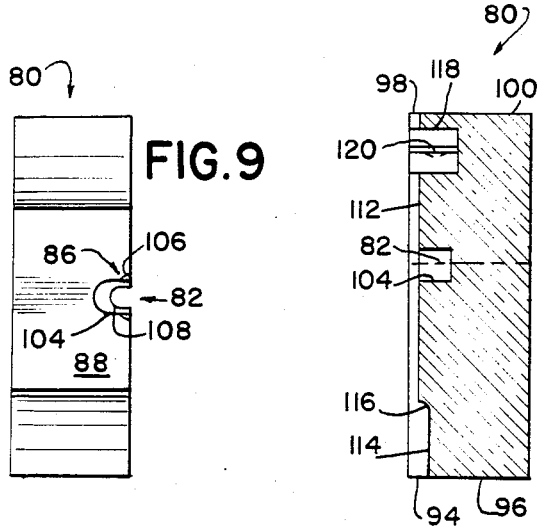
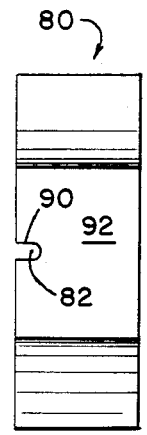
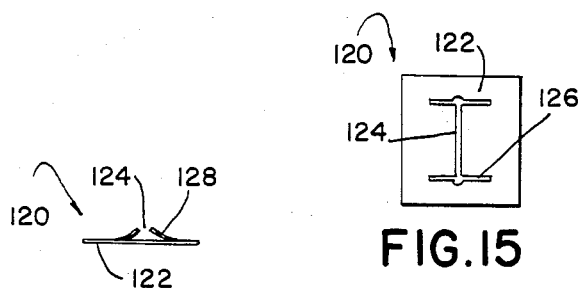
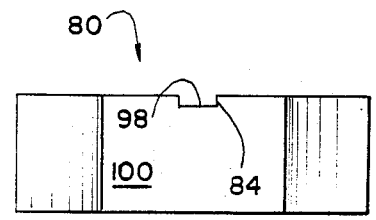

SELF-LOCKING FIBER OPTIC SEAL

BACKGROUND OF THE INVENTION

It is often desirable to determine whether a secure installation has remained unpenetrated over a given period of time. Mere inspection of the locking mechanism does not provide this information. It is impossible to determine whether the lock has been opened and re-closed or to determine whether the original lock has been destroyed and replaced by an identical substitute lock.

To overcome these problems, it has been a practice to attach a seal to the lock. A seal is a device which is irreparably broken or altered when the original lock is opened. A wide variety of seals are currently available.

Fiber optic seals have been described in U.S. Pat. Nos. 4,106,849; 4,407,415; 4,130,341 and 4,262,284. In each of these devices, a fiber optic bundle is passed through a fastening or locking device. By exposing one end of the bundle to a light source and observing the light emitted from the other end of the bundle, it is possible to determine whether anyone has tampered with the seal.

One problem with the known fiber optic seals is that they are relatively complex and hence are relatively difficult and expensive to produce. A need exists for a low cost seal with high integrity and tamper resistance. The present invention fulfills this need.

SUMMARY OF THE INVENTION

The present invention provides a low cost self-locking fiber optic seal with high integrity and tamper resistance.

The seal of the present invention has a fiber optic bundle which passes through a fastening device. The bundle has end fittings which are received in intersecting passageways formed in a block and which pass through each other at the intersection.

Two alternative means for locking the end fittings in the block are disclosed. In one embodiment, a flat portion of one fitting passes through a one-way push nut integrally formed in the other fitting to interlock the fittings. The interlocking and intermeshing relationship of the fittings prevents removal of the fittings from the block. In an alternative embodiment, one end fitting is press fit into the block and the other fitting is engaged by a one-way push nut mounted in an enlarged portion of its respective passageway. The intermeshing of the locked fitting with the press fit fitting insures that neither fitting can be withdrawn from the block.

The shapes of the passageways correspond to the shapes of the end fittings to prevent rotation of the fittings within the block, thereby insuring consistent fiber optic display. In addition, the shape of the passageways insures that the end fittings are properly aligned for intermeshing with each other.

One end fitting is provided with divided passageways around an opening which receives the other end fitting. The optic fibers in the bundle are divided and passed through these passageways. The divided fibers are then reunited and passed through a single passageway forming the end of the fitting.

The block is preferably formed from a unitary member. Alternatively, the block is formed from two mirror image halves.

Preferably, a hanger hole is provided in the block to allow the seal to be suspended from the block, thereby removing stress from the fiber optic bundle.

Objects of the invention are, therefore, to provide an improved fiber optic seal and to provide a low cost seal with high integrity and tamper resistance.

A further object of the invention is to provide a seal which includes a simply constructed block.

A further object of the invention is to provide a fiber optic seal wherein the ends of the fiber optic bundle pass through each other within the block. A further object of the invention is to provide a fitting on one end of the bundle in which the optical fibers are routed through divided passageways formed about an opening which receives a fitting connected to the opposite end of the bundle.

Another object of the invention is to provide a fiber optic seal wherein the fiber optic bundle is provided with end fittings which interlock with each other.

Yet another object of the invention is to provide a fiber optic seal wherein the ends of the optic bundle are locked in the block by a one-way push nut.

Still another object of the invention is to provide a fiber optic seal in which means are provided for insuring proper orientation of the ends of the bundle within the block.

Yet another object of the invention is to provide means for hanging a fiber optic seal by its block.

Yet another object of the invention is to provide interlocking end fittings for the fiber optic bundle in a seal wherein a one-way push nut is integrally formed in one of the end fittings.

Still another object of the invention is to provide a block for a fiber optic seal which is formed from two mirror image halves.

Still another object of the invention is to provide a block for a fiber optic seal which is unitary.

Still another object of the invention is to provide fiber optic locking apparatus comprising an elongated fiber optic bundle having first and second ends provided with first and second interlocking end fittings respectively, each of the end fittings being provided with fiber end light communicating openings for permitting passage of light through said fiber optic bundle.

Yet another object of the invention is to provide locking apparatus comprising a block, first and second passageways intersecting within the block, each passageway having an inlet opening on a surface of the block for receiving an end fitting, link means having first and second ends provided with first and second interlocking end fittings respectively, wherein the first and second end fittings are received in said first and second passageways respectively, the first and second end fittings interlocking with each other at the intersection of the first and second passageways.

Yet another object of the invention is to provide fiber optic locking apparatus comprising a block and a looped fiber optic bundle having ends locked in the block, said block being provided with means for hanging the block from a support.

Yet another object of the invention is to provide locking apparatus comprising a block, first and second passageways intersecting within the block, each passageway having an inlet opening on a surface of the block for receiving a link end, link means having first and second ends received in the first and second passageways respectively, the second end passing through the first end at the intersection of the first and second passageways, and wherein the second passageway is provided with locking means for preventing withdrawal of the second link end from the block.

Still another object of the invention is to provide a method for making an end fitting of a fiber optic bundle comprising providing a cylindrical tubular member, shaping the cylindrical member to form divided passageways therein, dividing the fiber optic bundle, inserting the bundle into the member, a portion of the fibers entering one passageway and the remainder of the fibers entering the other passageway, crimping an end of the member onto the fiber optic bundle, and flatening the cylindrical member.

These and other and further objects and features of the invention are apparent in the disclosure which includes the above and below specification and claims and drawings.

BRIEF DESCRIPTION OF THE DRAWINGS

FIG. 1 is a plan view of a fiber optic seal embodying features of the present invention.

FIG. 2 is a plan view of the apparatus shown in FIG. 1 in use.

FIG. 3 is a plan view of the block shown in FIG. 1.

FIG. 4 is a side elevational view of the block shown in FIG. 3.

FIG. 5 is a plan developmental view of the end fitting shown in FIG. 1.

FIG. 6 is a side elevational view of the end fitting shown in FIG. 5.

FIG. 7 is a plan view of the fiber optic bundle and end fittings used with the apparatus shown in FIG. 1.

FIG. 8 is a plan view of a half of an alternative block for a fiber optic seal.

FIG. 9 is a side elevational view of the apparatus shown in FIG. 8.

FIG. 10 is a side elevational view of another side of the apparatus shown in FIG. 8.

FIG. 11 is a sectional view taken along line 11—11 in FIG. 8.

FIG. 12 is a side elevational view of still another side of the block shown in FIG. 8.

FIG. 13 is a side elevational view of yet another side of the block shown in FIG. 8.

FIG. 14 is a sectional view taken along the line 14—14 in FIG. 8.

FIG. 15 is plan view of the push nut used with the block shown in FIG. 8.

FIG. 16 is a side elevational view of the push nut shown in FIG. 15.

DETAILED DESCRIPTION OF THE DRAWINGS

Referring to FIG. 1, the fiber optic seal embodying features of the present invention is generally indicated by the numeral 10.

The seal 10 includes an elongated cable-like fiber optic bundle 12. The bundle 12 typically includes over two hundred optic fibers encased in an outer coating or sheath. The sheath material may be armored, metallic or preferably plastic and may be reinforced with metal fibers or other reinforcing agents.

The ends of the bundle 12 are provided with first and second end fittings 14 and 16 respectively. The end fittings 14 and 16 can be made of any material, but are preferably made of metal. The structure of the first end fitting 14 differs from the structure of the second end fitting 16. Those structures will be described later in detail.

The end fittings 14 and 16 are configured to be received in respective first and second passageways 18 and 20 extending transversely through a block 22 and intersecting with each other at a central portion of the block 22. Preferably, the cross-sectional shapes of the passageways 18 and 20 correspond to the cross-sectional shapes of the end fittings 14 and 16 received therein to prevent rotation of the end fittings 14 and 16.

The block 22 can be formed of any material but is preferably formed of plastic. In the preferred embodiment, the block 22 is a unitary plastic element but, as will be described later, the block 22 can be alternatively formed from two mirror image halves. The preferred block 22 has the hexagonal shape shown in FIG. 1.

A first inlet opening 24 communicating with the first passageway 18 is centrally formed on one side 26 of the block 22 and a second inlet opening 28 communicating with the second passageway 20 is centrally formed on an adjacent side 30 of the block 22. A first outlet opening 32 communicating with the first passageway 18 is centrally formed on a side 34 of the block 22 opposite the side 26 provided with the first inlet opening 24. A second outlet opening 36 communicating with the second passageway 20 is centrally formed on a side 38 of the block 22 opposite the side 30 provided with the second inlet opening 28.

A through-bore 40 is formed in the block 22 for accommodating a block hanging hook. The bore 40 preferably extends in a direction perpendicular to the end surfaces of the block 22 and preferably is positioned midway between the first and second inlet openings 24 and 28. By hanging the seal 10 from the block 22, stress is released from the bundle 12.

Means are provided for locking the end fittings 14 and 16 in the block 22 after the end fittings 14 and 16 are inserted into the passageways 18 and 20. It is preferred that the end fittings 14 and 16 be locked in the block 22 by one-way locking devices such as push nuts. The specific structure of the locking devices will be described in detail later.

Use of the seal 10 is best understood by reference to FIGS. 1 and 2.

The first end fitting 14 is positioned in the first passageway 18. The second end fitting 16 and the fiber optic bundle 12 are passed through a hasp 42 or other fastening device used to lock a secure installation. The second end fitting 16 is then inserted into the second passageway 20 and locked therein. This prevents withdrawal of either end fitting 14 and 16 from the block 22. The fiber optic bundle 12 prevents the fastening device 42 from being opened.

If the end fittings 14 and 16 are locked in the block 22 by one-way locking devices, it is impossible to remove the end fittings 14 and 16 from the block 22 once they have been locked therein. The fiber optic bundle 12 must be cut and removed from the fastening device 42 before that device can be opened.

The optical fibers within the bundle 12 can be used to determine whether anyone has tampered with the fastening device 42 after it has been sealed.

The fibers within the bundle 12 extend to the distal open ends of the end fittings 14 and 16. The distal open ends are aligned with the outlet openings 32 and 36 formed in the block 22. To inspect for tampering, one of the outlet openings is exposed to a flashlight or other light source and the other outlet opening is visually observed. If the seal 10 has not been tampered with, the light from the source will be communicated through the fibers in the bundle 12 and will be emitted from the observed outlet opening. If, on the other hand, the seal 10 has been tampered with, some or all of the fibers in the bundle 12 will be broken or altered and will fail to properly communicate light to the observed outlet opening. This will result in telltale dark spots at the outlet opening.

It can also be determined whether the original seal has been replaced by a substitute seal. Because the fibers are randomly arranged in the bundle 12 and in the end fittings 14 and 16, the patterns of light displayed at the observed outlet opening will be uniquely characteristic to each individual seal 10. By making a photographic or other record of the characteristic light pattern when the seal 10 is first manufactured or first applied to the fastening device 42 and then comparing that record with the presently observed light pattern, it can be readily determined whether the present seal is the original seal, or is a substitute seal.

Although a visual or photographic inspection of the seal is the easiest way to determine tampering, it would be possible to remotely monitor the seal with electronic or electro-optical devices.

The preferred end fittings 14 and 16 are shown in detail in FIGS. 5-7.

The first end fitting 14 is in the nature of a ferrule having a medial portion 44, a diametrically enlarged proximal end portion 46 and a diametrically reduced distal end portion 48. A groove 50 having a V-shaped cross-section is centrally formed in the medial portion 44 and is aligned with the longitudinal axis of the fitting 14. The groove 50 has a relatively wide open top end 52 on one side of the end fitting 14 and a relatively narrow open bottom end 54 on an opposite side of the end fitting 14. Slits 56 perpendicular to the ends 52 and 54 are formed in the ends of the sidewalls 58 of the groove 50 to permit the sidewalls 58 to flex with respect to the remainder of the end fitting 14. The groove 50 thus provides a one-way push nut formed integrally with the end fitting 14.

The proximal end 46 of the fitting 14 is diametrically enlarged to accommodate the optic fibers and sheath of the bundle 12. The distal end 48 of the fitting 14 is diametrically narrowed and necked down from the medial portion 44 to act as a positioning guide for properly locating the fitting 14 within the block 22.

The second end fitting 16 is in the nature of a ferrule having a relatively short proximal end portion 60 and a relatively long distal end portion 62. The proximal end portion 60 is diametrically enlarged to accommodate the optic fibers and sheath of the bundle 12. The distal end portion 62 has a width which is slightly less than the length of the bottom end 54 of the groove 50 in the first end fitting 14. In addition, the distal end 62 is flatened to a thickness slightly greater than the width of said bottom end 54 and less than the width of the top end 52 of said groove 50. The surfaces of the distal end portion 62 are optionally provided with serations.

The preferred means for locking the end fittings 14 and 16 in the block 22 can now be readily understood.

The first end fitting 14 is first inserted into the first passageway 18 of the block 22. The distal end portion 48 of the fitting 14 is received in a distal end (not shown) of the passageway 18 and the necked-down transitional zone between the distal end portion 48 and the medial portion 44 of the fitting 14 defines a shoulder which abuts a shoulder formed between the distal end portion of the passageway 18 and the remainder of the passageway 18 to determine the extent of penetration of the end fitting 14 into the passageway 18. The shoulder is positioned so that the groove 50 in the fitting 14 is aligned with the second passageway 20 when the fitting 14 is fully inserted. If desired, the distal end portion of the passageway 18 can have an interference fit with the distal end portion 48 of the fitting 14 to securely hold the fitting in the passageway 18, but it will be appreciated that that is not necessary.

After the second end fitting 16 is passed through the fastening device 42, the distal end portion 62 of the fitting 16 is inserted into the second passageway 20. The distal end portion 62 enters the top end 52 of the groove 50 in the first end fitting 14 and passes out of the bottom end 54 of said groove 50. Passage of the distal end portion 62 through the groove 50 is facilitated by outward flexure of the side walls 58 of the groove 50. The necked-down transitional zone between the distal end portion 62 and the proximal end portion 60 of the end fitting 16 defines a shoulder which abuts a shoulder formed in the second passageway 20 when the end fitting 16 is fully inserted into the passageway 20.

If an attempt is now made to withdraw the second end fitting 16 from the second passageway 20, the frictional engagement between the surfaces of the distal end portion 62 and the bottom edges of the sidewalls 58 of the groove 50 will cause the sidewalls 58 to flex inwardly against the distal end portion 62. Any increase in the withdrawal force applied to the end fitting 16 will result in additional inward flexure of the groove sidewalls 58 and in the resultant application of additional pinching pressure to the distal end portion 62 of the end fitting 16. It will thus be appreciated that the second end fitting 16 is permanently interlocked with the first end fitting 14.

The locking of the distal end portion 62 of the second end fitting 16 in the one-way push nut defined by the groove 50 in the first end fitting 14 prevents withdrawal of the second end fitting 16 from the second passageway 20. The fact that the distal end portion 62 of the second end fitting 16 passes through the first end fitting 14 prevents the first end fitting 14 from being withdrawn from the first passageway 18 until the second end fitting 16 is withdrawn from the second passageway 20. Hence, the intermeshing and interlocking relationship of the end fittings 14 and 16 at the intersection of the passageways 18 and 20 permanently locks both end fittings 14 and 16 in the block 22.

It will be recognized that the seal 10 could be modified by eliminating the block 22. The end fittings 14 and 16 would simply be aligned in free space and then intermeshed and interlocked in the manner described above. However, this modification is less desirable because it leaves the one-way push nut mechanism exposed. The block 22 in the preferred embodiment encloses the interlock mechanism and prevents tampering therewith.

It will be further recognized that the seal 10 could be modified by substituting a simple plastic or wire cable for the fiber optic bundle 12. Such a modified device would be an effective seal. However, such a device is not preferred because it lacks the identifiability and inspectability features provided by the optical fibers.

The first end fitting 14 is formed from a cylindrical blank. The blank is shaped in a die to provide the proximal, distal and medial portions 46, 48 and 44. The medial portion 44 of the shaped blank is then stamped or pressed to slightly flatten the portion 44 and divide the passageway through the fitting 14 into separate pathways 64. The medial portion 44 is then centrally lanced between the pathways 64 to provide the groove 50.

The process for attaching the fitting to the bundle 12 is initiated by cutting and stripping the sheath 66 at an end of the bundle 12. The exposed optic fibers 68 are then randomly divided into two approximately equal groups 70 and 72. The bundle 12 is pushed into the proximal end 46 of the fitting 14 and each of the divided groups 70 and 72 enters a different one of the divided pathways 64. Further pushing of the bundle 12 into the fitting 14 causes the divided fiber groups 70 and 72 to pass around the groove 50 and to be reunited into a single fiber group in the single passageway defined by the distal end portion 48 of the fitting 14. The distal portion 48 has an open end which exposes the optical fibers located therein.

As the divided fibers 70 and 72 recombine in distal portion 48, some of the fibers intermingle and the fibers combine in unique groupings. Illuminating. only one half or other part of fiber group at the open distal end of the fitting 16 produces a unique light pattern display from the ends of the fibers visible through the distal open end of the fitting 14.

The bundle 12 should be stripped so that the distal end of the sheath 66 enters the proximal portion 46 of the fitting 14 and abuts the shoulder between the proximal portion 46 and the medial portion 44 when the distal ends of the fibers 68 are positioned in the distal open end 48 of the fitting 14. The proximal end portion 46 is then crimped onto the sheath 66 to fasten the fitting 14 to the bundle 12. After crimping, the entire end fitting 14 is flatened to provide an end fitting having the shape and dimensions described above.

The crimping and flatening is generally sufficient to secure the optical fibers within the fitting 14. However, if desired, the fibers can be bonded to inner surfaces of the fitting 14. In one method, the fibers are dipped in epoxy after they are inserted into the fitting. In another method, the fibers are bonded by wicking a low viscosity bonding agent, such as a cyanoacrylate, into fibers within the fitting 14.

The second end fitting 16 is formed from a cylindrical blank which is shaped in a die to provide the above described proximal and distal portions 60 and 62. The sheath 66 on an end of the bundle 12 is cut and stripped to expose the fibers 68. The stripped end of the bundle 12 is pushed into the proximal end 60 of the fitting 16. The stripped fibers 68 enter the distal portion 62 of the fitting 16 and the sheath 66 enters the proximal portion 60 of the fitting 16. The distal portion 62 has an open end which exposes the fibers positioned therein. The distal end of the sheath 66 abuts the shoulder between the proximal and distal portions 60 and 62 of the fitting 16 when the bundle 12 is fully inserted in the fitting 16. The proximal portion 60 is crimped into engagement with the sheath 66 and the entire fitting is then flatened to the shape and dimensions described above.

Although the first end fitting 14 has been described with reference to a specific type of push nut, it would be appreciated that any type of barb or one-way locking device capable of securing the second end fitting 16 can be integrally formed on the first fitting 14 instead. It is only necessary that the locking device be a one-way locking device and that means be provided for permitting the second end fitting 16 to intermesh with the first end fitting 14.

In the preferred embodiment, the passageways 18 and 20 in the block 22 have cross-sectional shapes which correspond to the cross-sectional shapes of the end fittings 14 and 16 received therein. This prevents the end fittings from rotating in the block, thereby insuring that the light patterns displayed at the outlet openings of the block 22 cannot be varied. In addition, the corresponding shapes insures that the end fittings 14 and 16 will be properly aligned and oriented with respect to each other for intermeshing and interengaging at the intersection of the passageways 18 and 20.

Referring to FIG. 4, it can be seen that the cross-sectional shape of the first passageway 18 differs from the cross-sectional shape of the second passageway 20. The first passageway 18 has a generally T-shaped cross-section for accommodating the generally triangular cross-section of the first end fitting 14. The base of said triangular cross-section, defined by the surface of the end fitting 14 provided with the top end 52 of the groove 50, is arranged to be perpendicular to the leg of the T-shaped cross-section with the apex of said triangular cross-section, defined by the bottom end 54 of the groove 50, extending into the leg of said T-shaped cross-section. The second passageway 20 has a generally rectangular cross-section corresponding to the cross-sectional shape of the distal portion 62 of the first end fitting 16. The second passageway 20 is aligned with the portion of the first passageway 18 defining the leg of the T-shaped cross-section.

The block 80 for an alternative fiber optic seal is shown in FIGS. 8–14 and is indicated generally by the numeral 80.

Preferably, the block 80 is assembled from two separately molded mirror-image halves. To assemble the block 80, the end faces of the halves provided with the passageways are brought into face-to-face abutment with the passageways aligned and then are fastened or bonded to each other. For convenience, only one of the halves is shown in the figures.

The block 80 has a generally hexagonal shape and the external appearance of the block 80 is similar to the external appearance of the block 22 used with the preferred fiber optic seal 10.

The block 80 has first and second passageways 82 and 84 respectively which intersect at the center of the block 80. The passageways 82 and 84 are configured to accommodate end fittings having cross-sectional shapes similar to the end fittings 14 and 16 discussed in connection with the preferred seal 10.

The first passageway 82 has a first inlet opening 86 centrally formed on one side 88 of the block 80 and a first outlet opening 90 centrally formed on an opposite side 92 of the block 80. The second passageway 84 has a second inlet opening 94 centrally formed on a side 96 of the block 80 adjacent the side 88 provided with the first inlet opening 86 and is provided with a second outlet opening 98 centrally formed on a side 100 of the block 80 opposite the inlet opening side 96.

A through-bore 102 for receiving a hanging hook is formed midway between the inlet openings 86 and 94. The bore 102 extends through the block 80 in a direction perpendicular to the end surfaces of the block 80.

The first passageway 82 is configured to receive an end fitting having a cross-sectional shape generally similar to the end fitting 14 used with the preferred seal 10. The passageway 82 has a medial portion 104 with a generally oval cross-sectional shape, an enlarged proximal portion 106 with a generally T-shaped cross-section, and a reduced distal portion 108 with a generally oval shape. The shapes and lengths of the portions 104, 106 and 108 are generally related to the shapes and lengths of the corresponding portions of the end fitting received in the passageway 82. The shoulder 110 formed at the junction of the medial and proximal portions 104 and 106 abuts the shoulder at the junction of the corresponding portions of the end fitting to limit the extent to which the end fitting is inserted into the passageway 82. If desired, the distal portion 108 of the passageway 82 can be provided with a width which is slightly less than the width of the corresponding portion of the end fitting received therein to produce an interference fit which holds the end fitting in the passageway 82. As shown in FIG. 12, the outlet opening 90 of the passageway 84 has a generally oval shape which is identical to the shape of the distal portion 108 of the passageway 82, the major axis of the oval being perpendicular to the end surfaces of the block 80.

The second passageway 84 is configured to receive an end fitting similar to the second end fitting 16 used with the preferred seal 10. The passageway 84 has a relatively long distal portion 112 having a generally rectangular cross-sectional shape and a relatively short proximal portion 114 having a generally cylindrical shape. The shapes and lengths of the portions 112 and 114 are generally related to the shapes and lengths of the corresponding portions of the end fitting received in the passageway 84. The shoulder 116 at the junction of the distal and proximal portions 112 and 114 of the passageway 84 abuts the shoulder at the junction of the corresponding portions of the end fitting to limit the extent to which the end fitting is inserted into the passageway 84. As shown in FIGS. 11 and 14, the distal portion 112 of the second passageway 84 intersects with the medial portion 104 of the first passageway 82, the medial portion 104 being considerably thicker than the distal portion 112. As shown in FIG. 13, the second outlet opening 98 has a generally rectangular shape corresponding to the shape of the distal portion 112 of the second passageway 84, the major axis of the rectangle being parallel to the end surfaces of the block 80.

The distal portion 112 of the second passageway 84 is provided with an enlarged portion 118 spaced slightly inwardly from the second outlet opening 98. The enlarged portion 118 is wider and thicker than the remainder of the distal portion 112 and is configured to accommodate a one-way push nut 120.

Details of the nut are shown in FIGS. 15 and 16.

The nut 120 is formed from a relatively thin rectangular plate-like member 122. The plate 122 is preferably steel. A longitudinal slit 124 is formed across the center of the plate 122. Lateral slits 126 perpendicular to longitudinal slit 124 are formed at the ends of the longitudinal slit 124 spaced slightly inwardly from the lateral edges of the plate 122. The surfaces 128 outlined by the slits 124 and 126 are angled slightly from the plane of the plate 122 to define a V-shaped depression with open top and bottom ends extending longitudinally across the plate 122. It will be appreciated that the V-shaped depression is similar to the V-shaped groove formed on the first end fitting 14 used with the preferred seal 10 and it will be readily recognized that the V-shaped depression can function as a one-way push nut in the same manner as the V-shaped groove 50.

The push nut 120 is aligned so that the longitudinal slit 124 is perpendicular to the axis of the second passageway 84 and parallel to the end surfaces of the block 80. The sides of the plate 122 between the lateral slits 126 and the lateral edges of the plate 122 are received in transverse extensions 130 of the enlarged portion 118 of the passageway 84. The extensions 130 hold the plate 122 in a position wherein the plate 122 extends across the second passageway 84 with the longitudinal slit 124 centrally aligned with the distal portion 112 of the passageway 84.

Use of the block 80 with a seal can now be readily understood.

One end fitting of a fiber optic bundle is inserted into the first passageway 82. Preferably, the fitting has a structure similar to the structure of the first end fitting 14 used in the preferred seal 10, with the exception that the push nut defined by the V-shaped groove 50 is replaced by a simple opening through the fitting 14 having a shape similar to the shape of the top end 52 of the V-shaped groove 50.

The fitting on the other end of the fiber optic bundle is passed through the fastening device and is then inserted into the second passageway 84. The end fitting is generally similar to the second end fitting 16 used with the preferred seal 10. The flat distal portion of the end fitting passes through the opening in the first end fitting at the intersection of the passageways 82 and 84 and is received through the longitudinal slit 124 in the push nut 120. The push nut 120 locks the end fitting in the passageway 84. The intermeshing of the first end fitting with the locked second end fitting effectively locks the first end fitting in the block 80 as well.

It will be understood that the passageways 82 and 84 perform the same alignment and orientation functions performed by the corresponding passageways 18 and 20 in the block 22.

A seal using the block 80 is functionally similar to the seal 10. The seal 10 is preferred because the block 22 used therein is a unitary member requiring no metal inserts and is thus easier and less expensive to manufacture.

Although the block 80 has been described with reference to a fiber optic bundle, it will be recognized that the block 80 can be used with any type of link or cable having the proper end fittings.

While the invention has been described with reference to specific embodiments, the exact nature and scope of the invention is defined in the following claims.

I claim:

1. Fiber optic seal apparatus comprising an elongated fiber optic bundle having first and second ends provided with first and second interlocking end fittings respectively, each of the end fittings being provided with fiber end light communicating openings for permitting passage of light through said fiber optic bundle, wherein the first end fitting is provided with a generally V-shaped groove having open top and bottom ends on opposite sides thereof and the second end fitting is provided with a flat longitudinally extending portion having a thickness slightly larger than the width of said open bottom end and smaller than the width of said open top end, said flat portion passing into the top end and out of the bottom end of said V-shaped groove and being held within the groove by engagement between said flat portion and said bottom end of the groove, the first end fitting being further provided with pathways on opposite sides of the V-shaped groove, a first portion of the fibers in said bundle extending through one of the pathways and the remainder of said fibers in said bundle extending through the other of said pathways.

2. The apparatus of claim 1 further comprising a block having first and second passageways intersecting within the block, each passageway having an inlet opening on a surface of the block for receiving an end fitting and an outlet opening on an opposite surface of the block for communicating light to or from the light communicating opening in the end fitting received in the passageway, wherein the first and second end fittings are received in said first and second passageways respectively, the first and second end fittings interlocking with each other at the intersection of said first and second passageways.

3. The apparatus of claim 1 wherein about half of the fibers in said bundle extend through each of the pathways.

4. The apparatus of claim 1 wherein the first end fitting is further provided with a pathway generally coaxial with the V-shaped groove which communicates with the pathways on the sides of the V-shaped groove for receiving the fibers extending through said latter pathways.

5. The apparatus of claim 1 wherein each of the end fittings is provided with fiber end light communicating openings for permitting passage of light through said fiber optic bundle and wherein each of the passageways has an outlet opening on a surface of the block opposite said surface with said inlet opening for communicating light to or from the light communicating opening in the end fitting received in the passageway.

6. The apparatus of claims 2, 1 or 28 further comprising means for fixing the rotational orientation of the ends of the fiber optic bundle within the block.

7. The apparatus of claim 6 wherein said fixing means comprises portions of said passageways having cross-sectional shapes corresponding to cross-sectional shapes of said ends of the fiber optic bundle.

8. Fiber optic seal apparatus comprising an elongated fiber optic bundle having first and second ends provided with first and second interlocking end fittings respectively, each of the end fittings being provided with fiber and light communicating openings for permitting passage of light through said fiber optic bundle, wherein the second end fitting passes through the first end fitting at said intersection.

9. Fiber optic seal apparatus comprising:
an elongated fiber optic bundle having first and second ends provided with first and seocnd interlocking end fittings respectively, each of the end fittings being provided with fiber and light communicating openings for permitting passage of light through said fiber optic bundle, and wherein the first end fitting is provided with a one-way locking means for receiving the second end fitting and for preventing said received second end fitting from being withdrawn therefrom.

10. Sealing apparatus comprising:
a block, first and second passageways intersecting within the block, each passageway having and inlet opening on the surface of the block for receiving an end fitting, and link means having first and second ends provided with first and second interlocking end fittings respectively, wherein the first and second end fittings are received in said first and second passageways respectively, the first and second end fittings interlocking with each other at the intersection of first and second passageways, and wherein the first end fitting is provided with a one-way locking means for receiving the second end fitting and for preventing said second end fitting from being withdrawn therefrom.

11. The apparatus of claim 9 or 10 wherein said one-way locking means comprises a push nut.

12. The apparatus of claim 11 wherein the push nut is formed integrally with said first end fitting.

13. The apparatus of claim 12 wherein the push nut comprises a generally V-shaped groove having open top and bottom ends on opposite sides of the first end fitting.

14. The apparatus of claim 13 wherein slits perpendicular to said bottom end are formed in ends of side walls of the groove to facilitate flexure of said side walls.

15. The apparatus of claim 13 wherein said second end fitting is provided with a flat longitudinally extending portion having a thickness slightly larger than the width of said open bottom end of the V-shaped groove and smaller than the width of said open top end of the V-shaped groove, said flat portion passing into the top end and out of the bottom end of said V-shaped groove and being held within said groove by engagement between said flat portion and said bottom end of the groove.

16. The apparatus of claim 15 wherein the flat portion of said second end fitting is provided with serations.

17. Sealing apparatus comprising
a block,
first and second passageways intersecting within the block, each passageway having an inlet opening on a surface of the block for receiving an end fitting, and
link means having first and second ends provided with first and second interlocking end fittings respectively,
wherein the first and second end fittings are received in said first and second passageways respectively, the first and second end fittings interlocking with each other at the intersection of the first and second passageways,
further comprising means for aligning the end fittings in the block to enable locking interconnection of said first and second end fittings, wherein said passageways have cross-sectional shapes related to the cross-sectional shapes of their respective end fittings, wherein the cross-sectional shape of said first passageway differs from the cross-sectional shape of the second passageway.

18. The apparatus of claim 17 wherein the first passageway has a generally T-shaped cross-section and the second passageway has a generally rectangular cross-section.

19. The apparatus of claim 18 wherein the passageways are oriented at the crossing with the second passageway in alignment with the portion of said first passageway defining the leg of said T-shaped cross-section.

20. The apparatus of claim 19 wherein the first end fitting is provided with a generally V-shaped groove having open top and bottom ends on opposite sides thereof and the second end fitting is provided with a flat longitudinally extending portion having a thickness slightly larger than the width of said open bottom end and smaller than the width of said open top end, said flat portion passing into the top end and out of the bottom end of said V-shaped groove and being held within the groove by engagement between said flat portion and said bottom end of the groove, the V-shaped groove being aligned with said leg defining portion.

21. Sealing apparatus comprising
a block,
first and second passageways intersecting within the block, each passageway having an inlet opening on a surface of the block for receiving an end fitting, and link means having first and second ends provided with first and second interlocking end fittings respectively, wherein the first and second end fittings are received in said first and second passageways respectively, the first and second end fittings interlocking with each other at the intersection of the first and second passageways, further comprising means for aligning the end fittings in the block to enable locking interconnection of said first and second end fittings, wherein said passageways have cross-sectional shapes related to the cross-sectional shapes of their respective end fittings, wherein the first passageway has a generally T-shaped cross-section and the first end fitting has a generally triangular cross-section, the base of said triangular cross-section being held within the first passageway perpendicular to the leg of said T-shaped cross-section.

22. Sealing apparatus comprising
a block,
first and second passageways intersecting within the block, each passageway having an inlet opening on a surface of the block for receiving a link end,
link means having first and second ends received in the first and second passageways respectively, the second end passing through the first end at the intersection of the first and second passageways, and
wherein the second passageway is provided with locking means for preventing withdrawal of the second link end from the block.

23. The apparatus of claim 22 wherein the link means comprises a fiber optic bundle.

24. The apparatus of claim 22 wherein the block is formed of two mirror image portions.

25. The apparatus of claim 22 wherein the locking means comprises one-way locking means for receiving the second end and preventing said received second end from being withdrawn therefrom.

26. The apparatus of claim 25 wherein the one-way locking means comprises a push nut.

27. The apparatus of claim 25 wherein the push nut comprises a plate extending across the second passageway at a location spaced from an outer end thereof, said plate being provided with a generally V-shaped depression having open top and bottom ends extending transversely across the passageway.

28. The apparatus of claim 27 wherein slits perpendicular to said bottom end are formed in the ends of the walls of the depression to facilitate flexure of said walls.

29. The apparatus of claim 27 wherein the second link end is provided with an end fitting having a flat longitudinally extending portion having a thickness slightly larger than the width of said open bottom end of the V-shaped groove and smaller than the width of said open top end of the V-shaped groove, said flat portion passing into the top end and out of the bottom end of said V-shaped groove and being held within said groove by engagement between said flat portion and said bottom end of the groove.

30. The apparatus of claim 29 wherein the first link end is provided with an end fitting having an opening formed therein to permit passage of said flat portion there-through.

31. The apparatus of claim 22 wherein the first link end is press fit within the block.

32. The apparatus of claims 22 or 35 wherein the first passageway has a relatively wide body portion and a relatively narrow end portion and wherein the first link end is provided with an end fitting having a relatively wide body portion and a relatively narrow end portion, the end portion of said end fitting being press fit within the end portion of said first passageway.

33. The apparatus of claim 30 further comprising means for aligning the end fitting in the block to enable said flat portion to pass through the opening in said end fitting on the first link end.

34. The apparatus of claim 33 wherein the aligning means comprises portions of said passageways having cross-sectional shapes corresponding to cross-sectional shapes of said end fittings.

35. The apparatus of claim 23 wherein each of the passageways has an outlet opening on a surface of the block opposite said surface with said inlet opening for communicating light to and from the ends of the fiber optic bundle received in the passageway.

36. The apparatus of claim 30 wherein the link means comprises a fiber optic bundle and the first end fitting is further provided with pathways on opposite sides of the opening formed therein, a portion of the fibers in said bundle extending through one of the pathways and the remainder of the fibers in said bundle extending through the other of the pathways.

37. The apparatus of claim 36 wherein the first end fitting is further provided with a pathway generally coaxial with the opening formed therein which communicates with the pathways on the sides of the opening for receiving the fibers extending through said latter pathways, 38. The apparatus of claim 27 wherein the second passageway has an enlarged portion for accommodating the plate.

39. A method for making an end fitting on a fiber optic bundle comprising
providing a cylindrical tubular member,
shaping the cylindrical member to form divided passageways therein,
dividing the fiber optic bundle,
inserting the bundle into the member, a portion of the fibers entering one passageway and the remainder of the fibers entering the other passageway,
crimping an end of the member onto the fiber optic bundle, and
flatening the cylindrical member.

40. The method of claim 39 further comprising applying a bonding agent to the fibers and bonding the fibers to the member.

41. Sealing apparatus comprising
a block,
first and second passageways intersecting within the block, each passageway having an inlet opening on a surface of the block for receiving an end fitting, and
link means having first and second ends provided with first and second interlocking end fittings respectively,
wherein the first and second end fittings are received in said first and second passageways respectively, the first and second end fittings interlocking with each other at the intersection of the first and second passageways, wherein the second end fitting passes through the first end fitting at said intersection.

* * * * *